May 16, 1961

D. A. CHRISTENSEN 2,984,526

RAILROAD JOURNAL BEARING

Filed April 13, 1959

May 16, 1961 D. A. CHRISTENSEN 2,984,526
RAILROAD JOURNAL BEARING
Filed April 13, 1959 2 Sheets-Sheet 2
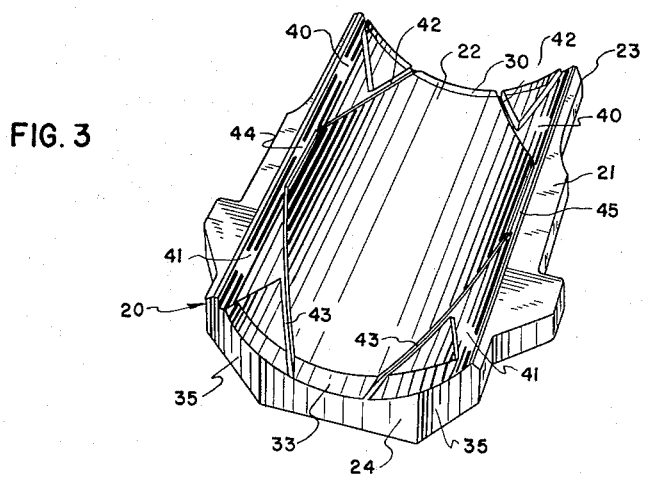
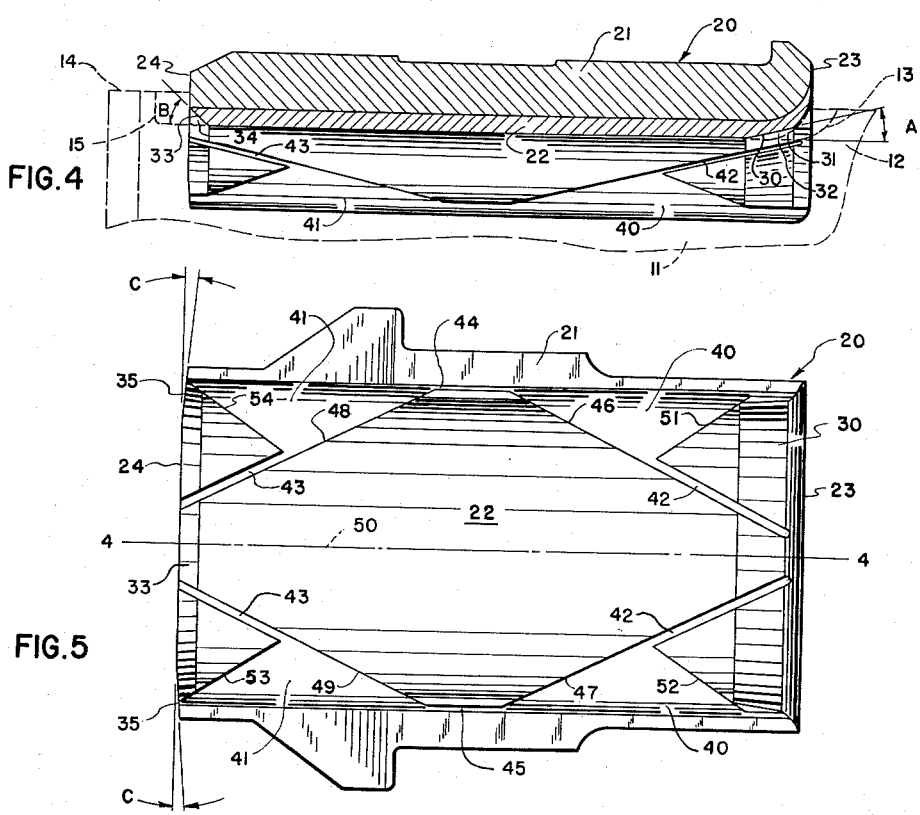

United States Patent Office 2,984,526
Patented May 16, 1961

2,984,526
RAILROAD JOURNAL BEARING

Dan A. Christensen, Menlo Park, Calif., assignor to Federal-Mogul-Bower Bearings, Inc., Detroit, Mich., a corporation of Michigan Filed Apr. 13, 1959, Ser. No. 805,844
3 Claims. (Cl. 308—79.1)

This invention relates to an improved journal bearing and more particularly to an improved railroad journal bearing.

That railroad journal bearings have often given trouble is well known, and many steps have been taken to try to overcome the difficulties. Various lubricating devices have been conceived, and many of them have been put into service, yet many problems remained. Journal bearings have often "pulled" or become scored even when the best lubricating devices were used and when the greatest care was taken to protect them from foreign matter getting in between the journal and the bearing.

I have discovered that the structure of the bearing itself was one of the main reasons why these problems had not been solved and have devised a new bearing which overcomes these difficulties.

For example, I have found that when lateral forces moved the bearing against the fillet, extremely high pressures developed in some areas. In my new bearing design the high pressure areas are eliminated.

Similar troubles were caused when lateral forces moved the bearing against the axle collar, where there is a radius portion like the fillet but much smaller. My new bearing eliminates the high pressure area that formerly was produced here, and it additionally provides an oil reservoir for the flat bearing surfaces of the collar and the end of the bearing.

My new bearing also provides an additional lead-in for oil between the collar and the bearing and lubricates their contacting surfaces with an oil film.

Still further, the invention provides a system of oil pockets and grooves that feeds oil to the critical areas of the bearing which lie principally at the ends of the bearing.

Other objects and advantages of the invention will appear from the following description of a preferred embodiment thereof.

In the drawings:

Fig. 3 is a perspective view of the bearing shown in Figs. 1 and 2 with the bearing inverted to show its novel bearing surface.

Fig. 4 is a view in section of the bearing taken along the line 4—4 in Fig. 5 and showing the journal in phantom in its two extreme positions.

Fig. 5 is an enlarged plan view of the bearing looking up on it as it is shown in Figs. 1 and 2, or down on it as shown in Fig. 3.

Figure 1:
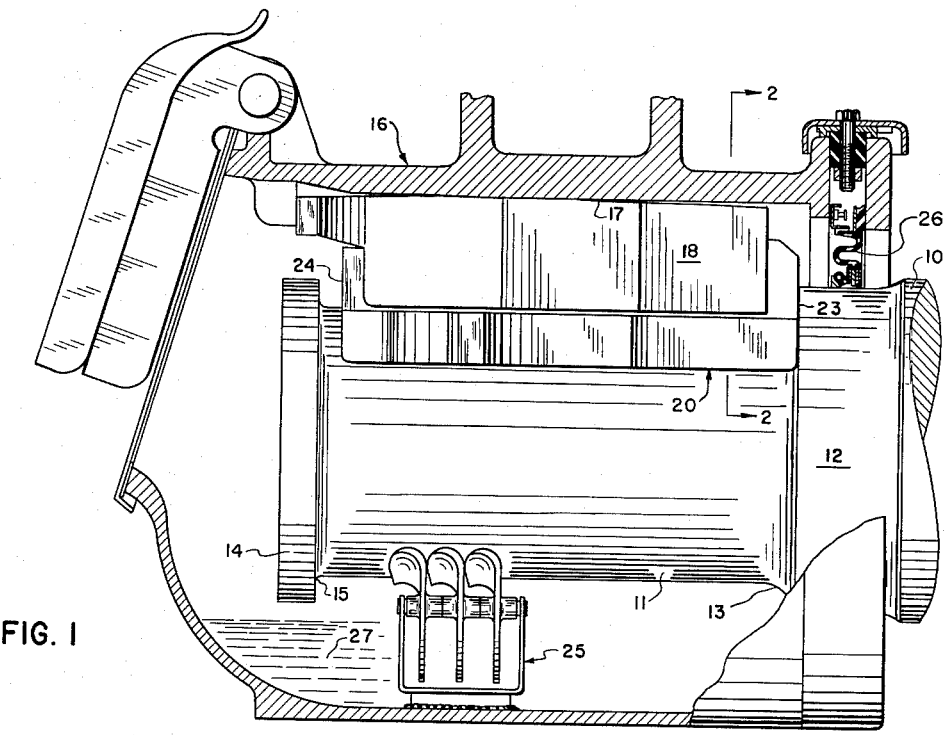
Fig. 1 is a view in elevation and in section of a railroad journal and bearing assembly incorporating the present invention.
Figure 2:
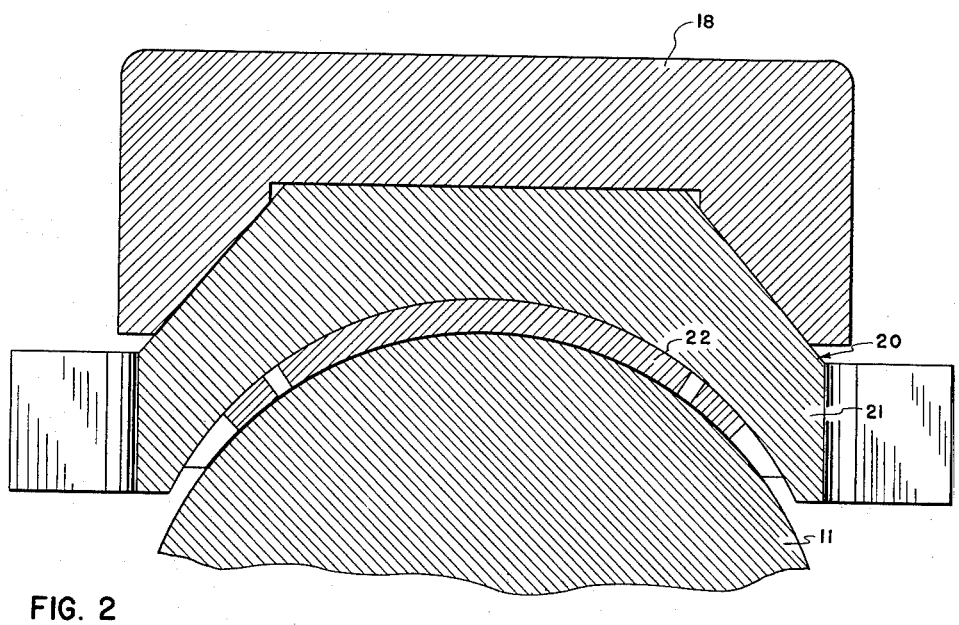
Fig. 2 is a gratly enlarged fragmentary view in elevation and in section taken along the line 2—2 in Fig. 1.

Fig. 1 shows a typical installation incorporating the invention. A railroad car axle 10 has a journal 11, to which it is joined by a dust-guard seat 12 and a fillet 13. The journal 11 terminates in a collar 14 to which it is joined by a short radius portion 15. The railroad car side frame (not shown) has a journal box 16. The box ceiling 17 bears upon a wedge 18, and the wedge 18 is supported by a bearing 20, comprising a brass back 21 and a bearing lining 22, of suitable bearing metal such as babbitt.

The bearing 20 has ends 23 and 24 (see Fig. 5 especially) that can engage the fillet 13 and collar 14 respectively. Because of inherent crookedness or deviations in the rails of railroad tracks, the bearing 20 is given sidewise play of at least ¼", often ½" or higher, corresponding to movement from left to right and right to left in Fig. 1. This sidewise movement is limited by the fillet 13 in one direction and the collar 14 in the other direction.

A lubricator 25, like that shown in U.S. Patent 2,865,-686, splashes and applies oil on the journal 11, and an oil seal 26 like that in U.S. Patent 2,823,051, retains the lubricant 27 in the box 16. But there has always been a problem in assuring lubrication at the ends of the bearing 20. Moreover, the curvature of the fillet 13 resulted in loading very high forces on prior-art bearings, which conformed to the shape of the fillet, especially when lateral forces moved the bearing against the fillet.

In the present invention (see Figs. 2–5), the lining 21 is provided with a relief or relieved portion 30 cut at an angle A (see Fig. 4) of preferably about 15°, so as to prevent contact between the bearing 20 and the nearly cylindrical portion 31 of the fillet, as shown in Fig. 4. This structure means that there is no extreme high-pressure area between the bearing 20 and the journal fillet 13, as there was when lateral forces moved prior-art bearings against their fillets. While this relief 30 increases the unit pressure on the remainder of the fillet 13, the angle of the fillet arc where pressure is increased is steep enough so that the lateral component does not produce a greatly magnified resultant force, as it did with the more nearly cylindrical portions of the fillet. The area cut away is that where the highest unit pressures occurred on conventional bearings, and where the lining usually started to pull on those bearings. Instead, an area 32 is left to be filled with oil.

At the other end of the bearing 20, a relief 33 at angle B (preferably of about 45°) performs the same general function at the axle collar radius portion 15, which is much smaller than the fillet 13. This relief 33 also provides an oil reservoir 34 (see Fig. 4) for the flat bearing end surface 24 and the radial face of the collar 14.

A third relief, or beveled portion 35 is provided at each side of the end face 24 with an angle C, preferably of about 5°, and provides a lead-in for oil between the collar 14 and the end 24 of the bearing 20. These bevels 35 help to form an oil wedge at the bearing entrance and help to establish a film of oil between the rubbing surfaces.

My bearing also provides generally triangular depressions or oil pockets 40 and 41 and grooves 42 and 43 which act in conjunction with each other to feed oil into critical bearing areas, principally the areas at the ends of the bearing. The pockets 40 and 41 converge respectively into the grooves 42 and 43 and therefore maintain a certain oil pressure and flow in the grooves. The pockets 40 and 41 and the grooves 42 and 43 may be about ³⁄₁₆" deep. The grooves 42 feed the fillet bearing area 32 directly and also feed the relief 33 at the other ends. The copious flow not only lubricates the bearing 20 and between the bearing 20 and the journal 11, but also cools the critical bearing areas.

The pockets 40 and 41 are bounded by the longitudinal edges 44 and 45 of the bearing liner 22, and by diagonal lines 46, 47, 48 and 49 (Fig. 5) that extend from points spaced away from the midpoints of the edges 44 and 45 to points at the end walls 23 and 24 spaced away from the longitudinal centerline 50 of the liner 22. The grooves 42 and 43 are continuations of the lines 46, 47, 48 and 49. The pockets 40 and 41 are further defined by diagonal lines 51, 52, 53 and 54 leading catercornered from points near where the edges 44 and 45 meet the end walls 23 and 24. This leaves quite sufficient bearing area and improves the lubrication of the bearing. Oil flows into the pockets 40 and 41 from the lubricator 25 and flows outwardly along the grooves 42 and 43.

From the foregoing, it will be seen that the pockets 40, 41 and grooves 42, 43 cooperate directly with the reliefs 30, 33, and 35 and that the reliefs 30 and 33 and 33 and 35 cooperate with each other to give special benefits. However, some of these benefits, through to a lesser degree can be obtained by bearings having some though not all of these features in combination. The best results, however, depend on the complete combination.

To those skilled in the art to which this invention relates, many additional changes in construction and widely differing embodiments of the invention will suggest themselves without departing from the spirit and scope of the invention as defined in the claims.

What is claimed is:

1. The combination of a railroad journal having an arcuate fillet leading to an enlarged portion at one end and a radius portion leading to a collar at the other end, and a bearing having a concave surface, vertical end walls, and longitudinal edges, the end wall facing said fillet being connected to a portion generally arcuate in cross-section, whose radius corresponds to that of the fillet, a first frusto-conical relief connecting said arcuate portion to said surface, said relief eliminating contact between the bearing surface and the gentler sloping portion of said fillet and thereby eliminating the high pressures attendant upon such contact under lateral movement of said journal relative to said bearing, said bearing having a second frusto-conical relief at its other end completely eliminating contact of said bearing with said radius portion and providing an oil reservoir there and eliminating the high bearing pressure attendant upon relative lateral movement of said bearing against said collar radius portion, the vertical end wall of said bearing facing said collar having its extremities lying on planes that diverge from the normal plane of said end wall to provide a lead-in for oil between that said end wall and said collar, said bearing surface having depressions bounded by each said longitudinal edge and by four diagonal lines each leading from a said edge to a point on one end wall, said bearing having a groove in said concave surface along each of said four lines the same depth as each said depression, each said depression being further bounded by a line leading catercorner from adjacent each corner of said bearing surface, said depressions forming an oil-lead-in to said bearing surface and said grooves forming oil passage for flow of oil from said depressions out to the ends of said bearing.

2. The combination of a cylindrical railroad journal having an arcuate fillet leading to an enlarged cylindrical portion at one end and a radius portion leading to a cylindrical collar at the other end, and a bearing having a concave surface forming a segment of a cylinder, vertical end walls, and longitudinal edges, and being symmetrical with respect to a longitudinal centerline, the end wall facing said fillet being connected to a generally arcuate portion whose radius corresponds to that of the fillet, a first frusto-conical relief joining said arcuate portion to said cylindrical segment and extending from said segment at an angle of about 15° with the centerline of said bearing, said relief eliminating contact between the bearing surface and the gentler sloping portion of said fillet and thereby eliminating the high pressures attendant upon such contact under lateral movement of said journal relative to said bearing, said bearing having a second frusto-conical relief at its other end extending at an angle of about 45° with the centerline of said bearing and completely eliminating contact of said bearing with said radius portion and providing an oil reservoir there and eliminating the high bearing pressure attendant upon relative lateral movement of said bearing against said collar radius portion; the vertical end wall of said bearing facing said collar having its extremities lying on planes that diverge from the normal plane of said end wall at angles of about 5°, to provide a lead-in for oil between that said end wall and said collar; said bearing surface also having depressions bounded by and open on each said longitudinal edge and by four lines each leading from a said edge at points spaced from the midpoint of said edge and leading to a point on the closer of said end walls to said points, spaced from said longitudinal centerline, said bearing having a groove in said surface along each of said four lines substantially the same depth as each said depression, each said depression being further bounded by a line leading from a point adjacent the intersection of said end walls with said longitudinal edges to said groove and extending catercorner, said depressions forming an oil-lead-in to said bearing surface, and said grooves forming an oil passage for flow of oil from said depressions out to the ends of said bearing.

3. A railroad journal bearing having a concave cylindrical surface, end walls, and longitudinal edges, with pockets depressed in said surface and bounded by said edges and by lines leading from said edges at points spaced from the midpoint of said edge and leading to points on said end walls spaced from said longitudinal centerline, said bearing having a groove in said surface along each of said four lines the same depth as each said pocket, each said pocket being further bounded by a line leading from a point adjacent the intersection of said end walls with said longitudinal edges to said groove and extending catercorner, said pockets forming an oil-lead-in to said bearing surface and said grooves forming oil passage for flow of oil from said pockets out to the ends of said bearing.

References Cited in the file of this patent

UNITED STATES PATENTS

| 2,072,168 | Heckman | Mar. 2, 1937 |

FOREIGN PATENTS

| 655,118 | France | Dec. 8, 1928 |
| 592,998 | Great Britain | Feb. 21, 1934 |
| 764,537 | Germany | May 21, 1951 |
| 848,124 | Germany | Sept. 1, 1952 |